United States Patent Office

3,778,334
Patented Dec. 11, 1973

1

3,778,334
HIGH MODULUS ORGANIC FIBER LAYERS ALTERNATING WITH INORGANIC FIBER LAYERS IN A RESIN MATRIX
Donald L. G. Sturgeon, Wilmington, Del., assignor to E. I. du Pont de Nemours and Company, Wilmington, Del.
No Drawing. Filed Apr. 20, 1971, Ser. No. 135,800
Int. Cl. B32b 5/12, 5/28
U.S. Cl. 161—156                                                    7 Claims

ABSTRACT OF THE DISCLOSURE

Fibrous reinforced resin composites comprising high modulus organic fibers and inorganic fibrous materials in specified proportions demonstrate surprising increases in a structural property above those predicted by the Rule of Mixtures.

---

This invention provides novel combinations of high modulus organic and inorganic fibrous materials, described in detail hereinafter as reinforcing components in plastic composites or laminates. Other uses include sound insulation material and filtration media (e.g., particle-laden gas streams).

BACKGROUND OF THE INVENTION

Fibrous-reinforced resins and composites constitute an old an an important part of our technology. Interspersed, mixed or interwoven, or layered reinforcing longitudinal materials (including metal wires and fibrous materials, e.g., glass, asbestos, nylon, in the form of e.g., chopped random short fibers, mats, rovings, yarns, strands, filaments, fabrics, and cloth) are useful to reinforce plastic resinous materials in order to increase the stiffness and strength of the product, according to the teaching of U.S. 2,836,529.

In recent years the requirements of the aircraft and the aerospace industries for lighter, stronger, and stiffer materials of construction have led to significant advances in new fiber and reinforced resin technology. An excellent reference in this area of technology is "Handbook of Fiberglass and Advanced Plastic Composites," G. Lubin, editor, Van Nostrand Reinhold Company (1970). While many new fibers prepared from e.g., ceramics, boron, and graphite, exhibit attractive properties, they are generally very brittle and thus difficult to fabricate into tapes, fabrics, composites, etc., without damage to the fibers. Their brittle fracture characteristic also make their composites generally low in toughness and impact strength. In addition, their very high costs have limited their penetration of commercial markets.

The preparation of a high modulus poly(p-benzamide) fiber and use thereof in preparation of a simple composite is shown in French 1,526,745. Composites with organic and inorganic fiber reinforcement where the inorganic fiber is located strategically in portions of the composites subjected to compressive stress are described in Green et al. U.S. 3,556,922.

SUMMARY OF THE INVENTION

The present invention provides prepregs and composites or laminates comprised of a matrix system with a reinforcing amount of an organic/inorganic fibrous combination. The textile combinations of the high modulus organic and inorganic fibrous materials may take numerous forms, for example, sliver; rovings; strands; spun yarn, cordage; plied yarn; twisted yarn; wrapped yarn; cloth; scrim cloth; knitted, braided, and woven fabrics. The textile combinations are comprised of from about 18 to 82% by volume (based on total fiber content) of the organic component with the remainder being the inorganic component. Wide latitude exists in the manner in which the organic and inorganic components may be arranged within the composite. The amounts of fibrous materials which provide reinforcement are determined in a manner that takes into account the type and degree of reinforcement desired. For example, the reinforcing components may be present as unidirectionally-oriented layers of fabric and/or tape, or filaments or yarns (e.g., side-by-side or plied). Cross-ply or angle ply construction may be employed (e.g., with alternating layers of organic and inorganic fabrics and/or tapes). The reinforcement may be in the form of wrapped yarns or fabrics woven from organic and inorganic yarns.

The composites are preferably comprised of from about 15 to 70 volume percent (most preferably 30 to 60 volume percent) of resin, from about 15 to 70 volume percent (most preferably about 20 to 50 volume percent) of a fibrous material prepared from high modulus organic fibers, and from about 15 to 70 volume percent (most preferably 20 to 50 volume percent) of inorganic fibrous material, all as described hereinafter.

It will be understood that conventional additives such as dyes, fillers, UV stabilizers, antioxidants, etc., can be incorporated into the fibrous materials, the resin, and/or the composite; coatings, sizes, dips, etc., can be applied to the fibrous materials, e.g., "whiskerizing" of graphite, for the purposes intended prior to the preparation thereof, although the processing advantage offered by this invention may obviate or reduce the need for them. The composites may be in the form of prepregs, i.e. reinforcing components with uncured resin usually advanced to the B-stage, ready for curing.

Composites of this invention variously demonstrate surprising increases, e.g., above those predicted by the Rule of Mixtures, in a property such as ultimate flexural strength, specific flexural strength, proportionality limit stress, and off-set yield stress (all as defined hereinafter) when contrasted with control composites. Also, impact strengths are surprisingly high.

Substantially uniform distribution of both organic and inorganic fibers in, e.g., a 60% fiber by volume composite, where the inorganic fiber content is less than about 10–12% by volume in the composite, produces some improvement in properties such as off-set yield strength or ultimate flexural strength over that predicted by Rule of Mixtures although not to the degree found by strategically locating the inorganic fiber on the compressive side of the flexural bar, as described in Green et al. U.S. 3,556,922. However, at about 15% by volume inorganic fiber content, uniform distribution of both types of fiber throughout the composite produces a more rapid and surprising improvement in properties above those predicted by Rule of Mixtures. By "uniformly distributed throughout the composite" is meant that both the inorganic and organic fibers in the defined proportions are present in the central and the outer portions of the composite.

The preferred composites of this invention when in a unidirectional 60% by volume fiber configuration have an ultimate flexural strength of at least 50,000 lb./in.$^2$, or a proportionality limit value of at least 30,000 lbs./in.$^2$, or a flex modulus of at least $6 \times 10^6$ lbs./in.$^2$, or an offset yield strength of at least about $40 \times 10^3$ lb./in.$^2$, or an impact strength of at least 25 ft.-lb./in.$^2$. The composites of the invention are advantageously used as the skins of flat or curved sandwich structures with a honeycomb core.

The composites of this invention exhibit a fail safe, ductile character when breaking in flexure, in contrast to the sudden, brittle, catastrophic failure in flexure of similar composites prepared with, e.g., commercially available graphite fiber reinforcement.

DETAILED DESCRIPTION OF THE INVENTION

Organic fibrous component

The organic fibers used in this invention (e.g., as filaments or yarns, or in fabrics or tapes) should have a tenacity of at least about 4 grs./den. (g.p.d.) (preferably at least about 10 g.p.d.), a tensile modulus of at least about 140 g.p.d. (preferably at least about 450 g.p.d.), and an orientation angle less than about 45°, preferably less than 35°.

A variety of organic polymers are capable of being spun into the fibers useful in this invention, i.e., those with the tensile properties noted above. While not limited thereto, aromatic polyamides (e.g., commercially available Nomex® nylon) are particularly suitable as a source of these fibers. Also among this class are those aromatic polyamides described in Green et al. U.S. 3,556,922; French 1,526,745; Belgian 726,050; and Belgian 734,387. Especially preferred are fibers prepared from wholly aromatic linear polyamides wherein rigid chain-extended bonds reduce the capability of the polymer chain to fold or rotate. Such polyamides have essentially coaxial or parallel and oppositely directed chain-extending bonds from each aromatic nucleus. Such polyamides are characterized by recurring units of the Formula I or II and copolymers containing recurring units of Formulae I and II as shown below. In the formula (I)
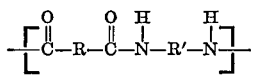

R and R' (when the chain-extended bonds are essentially coaxial) may be selected from the group of 1,4-phenylene; 4,4'-biphenylene and ring-substituted derivatives thereof. R and R' (when the chain-extending bonds are essentially parallel) may be selected from the group of e.g., 1,5-naphthylene; 2,6-naphthylene; and ring-substituted derivatives thereof. Substituents on these rings may be halogens (chloro, bromo, and fluoro), lower alkyl (e.g., methyl, ethyl, isopropyl, and n-propyl), lower alkoxy (e.g., methoxy and ethoxy), cyano, acetyl, and nitro.

Additional useful aromatic polyamides are characterized by recurring units of the formula:

(II)
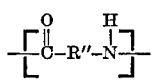

wherein R'' is selected from the group of, e.g., 1,4-phenylene; 4,4'-biphenylene; and substituted derivatives thereof.

Among these suitable aromatic polyamides representative of the above-cited formulae, may be named poly (p-benzamide); poly(p-phenylene terephthalamide); poly (2-chloro-p-phenylene terephthalamide); poly(2,6-dichloro-p-phenylene 2,6-naphthalamide); poly(p-phenylene p,p'-biphenylenedicarboxamide); poly(p,p'-phenylene benzamide); poly(1,5-naphthalene terephthalamide); ordered aromatic copolyamides such as, e.g., copoly(p,p'-diamino-benzanilide terephthalamide), and random copolyamides such as, e.g., copoly(p-benzamide/m-benzamide) (95/5); and many others. Polyamides that contain both aromatic and aliphatic units in the polymer chain are also sources of fibers useful in this invention.

Other polymers from which fibers useful in this invention may be prepared include polyhydrazides, e.g., poly-(terephthalic hydirazide), polyamide-hyldrazides, e.g., poly(p-benzamide/terephthalic hydrazide), and derivatives thereof. Suitable fibers of these polymers are shown in Frazer U.S. 3,536,651; Preston U.S. 3,484,407; and German Offen. 1,938,282.

Other polymers useful for producing the fibers used in this invention may comprise radicals with heterocyclic rings, may contain aromatic units whose chain-extending bonds are other than coaxial or parallel and oppositely directed (e.g., they may be meta-oriented), and they may contain other chain-extending linkages, e.g., urea linkages. Examples of these are shown, e.g., in Belgian 734,387. Copolymers, both random and ordered, which are suitable for fibers used in this invention are known in the art. By the term "random" is meant that the copolymer consists of molecules containing large numbers of units comprised of two or more different types in a regular sequence. Blends of homo- and copolymers also provide fibers suitable for use in this invention. Procedures for preparing these polymers and fibers thereof are described in references previously cited, e.g., U.S. 3,556,922 and Belgian 734,387.

Inorganic fibrous component

The phrase "inorganic fibrous materials" as used herein includes the fibrous elements such as ceramic fibers made of glasses (e.g., S and E-glass, high modulus glasses such as United Aircraft's UARL-344, fused silica), oxides, borides, carbides; graphite fibers, boron fibers, nitride fibers, metal fibers (e.g., steel piano wire), and fibers of intermetallics. Suitable fibers will have a tensile strength of at least 50,000 lb./in.$^2$ (preferably at least 100,000 lb./in.$^2$) and a tensile modulus of at least $6 \times 10^6$ lg./in.$^2$. They are used in this invention preferably in the form of continuous filaments although discontinuous length fibers and even short, single crystal particles or fibrous elements having a minimum length to maximum average transverse dimension of about 10:1, termed "whiskers," can be used. The inorganic component may be present as filaments, yarns, fabrics, tapes, and other constructions.

Useful oxide fibers include those of aluminum oxide, chromium oxide, magnesium oxide, titanium oxide, thorium oxide, and others described in Dutch patent application No. 6904582; of these oxides, aluminum oxide fibers are preferred.

Resins

A wide variety of conventional thermosetting and thermoplastic polymer matrices can be used in preparing the composites of this invention. For reference, see "Handbook of Reinforced Plastics" of The Society of the Plastics Industry, Inc., S. S. Oleesky and J. G. Mohr, Reinhold, 1964. The preferred thermosetting matrices herein include phenolic (e.g., phenolformaldehyde), polyester, epoxy (including conventional epoxy, epoxy novalak, and epoxidized polyolefin), polybenzimidazoles, polyamide-hydrazides, and polyamide-imides. The preferred thermoplastic matrices herein include polycarbonate, polyalkylene (e.g., polyethylene and polypropylene), polyamides, and fluorocarbon (e.g., polytetrafluoroethylene). Among the other suitable thermosetting matrices may be named alkyd melamine, ureaformaldehyde, silicone, phenyl-silane, polyimide, butadiene and thermosetting acrylics; among the other suitable thermoplastic matrices may be named vinyls and polystyrene [including acrylonitrile - butadiene - styrene (known as ABS)]. Other suitable matrix polymer such as natural or synthetic rubber, which are either thermoplastic or thermosetting (e.g., depending on the extent of vulcanization) can be suitably employed.

It is to be understood that the conventionally employed curing agents, accelerators, plasticizers and toughening agents (e.g., rubbers), and other ingredients employed in the conventional preparation of composites may be employed in this invention. Also, a single resin or mixtures of suitable resins may be used for the matrix system.

Process considerations: composite preparation

The textile combinations used in this invention may be prepared (e.g., by twisting, weaving, wrapping) by generally conventional methods of the industry, with some allowance being taken, if necessary, for the relatively brittle and/or weaker nature of the inorganic components, e.g., slower fiber advancing speed through guides, shuttles, etc., may be required than for use of the organic component alone. For example, brittle fibers such as boron and graphite can be protected from abrasion by wrapping with organic fibers such as (p-benzamide). By wrapping with two ends in opposite directions, a yarn with net zero twist is obtained and there is no tendency for the wrapped yarn to twist by itself. The minimum number of wraps is determined by the degree of cover required for protection of the inorganic yarn while the upper limit is obtained when the yarn becomes too stiff to bend readily. About 2 to 10 wraps/inch of two ends of 200 denier poly(p-benzamide) around 200–500 denier boron or graphite is an example of the range from poor cover to high yarn stiffness. Fabrics can be woven much faster by prewrapping inorganic fibers with organic fibers rather than weaving with separate yarns.

Large diameter fibers, such as commonly made 0.004 inch diameter boron, can be bent over a much smaller radius when wrapped with organic fiber, according to this invention. Wrapped boron can be bent over a radius as small as ⅛ inch where it will break but the broken ends are nevertheless carried around the bend by the organic wrapping yarns. Thus, wrapped boron passes readily over guides that would not only break unwrapped fiber but would also end the feed. Sharply contoured surfaces can be wound which would not be possible with inorganic fiber simply laid side-by-side with organic fiber.

In composites of this invention wrapping improves transverse composite strength.

In general any of the well-known techniques of the art of composite preparation can be used. Continuous fibers can be impregnated by passing through a liquid resin bath before ordering layup in the wet state or fabrics can be melt-coated with resins of the appropriate viscosities. Another means of impregnation is by pre-impregnating fibers, tapes of parallel fibers, or woven fabrics with either (1) molding resins that can be advanced to a B-stage or partially polymerized such as phenolics, or (2) solutions of resins such as epoxies and then partially polymerizing or drying the prepreg. In this state the prepreg can be stored for reasonable length of time before being assembled in the final composite and the resin completely cured at elevated temperature. Vacuum bag, pressure bag and autoclave molding processes can be used to obtain good quality composition.

Chopped organic and inorganic fibers can be used for the purposes of this invention as in injection molding, compression molding, etc., or sprayed on appropriate molds using processes well known in the chopped fiber glass reinforced plastics art.

The reinforcing components of the composites of this invention may be positioned within the composite in a variety of ways, according to the purpose for which use of the composite is intended. This is well-illustrated in the examples which follow.

Organic fiber tensile properties

Organic fiber properties of tenacity, elongation, and initial modulus are coded as T/E/Mi and are reported in their conventional units, i.e., grams per denier, percent, and grams per denier. Denier is coded as den. Such properties are conveniently measured in accordance with ASTM operational specifications, D76–53 (October 1962), utilizing a testing machine, e.g., an Instron tester (product of the Instrom Engineering Corp., Canton, Mass.), providing a constant rate of extension. Unless otherwise specified, samples having a break elongation of up to about 8% are tested at a rate of extension of 10%/minute; samples of higher break elongation are tested at 60%/minute. Samples are filaments which measure 1 inch (2.54 cm.) in length or yarns having 3 turns/inch which measure 10 inches (25.4 cm.) in length; and testing is done at 21° C. and 65% R.H.

Inorganic fiber tensile properties

Inorganic fiber tensile properties quoted in the examples of this invention are as presented in the manufacturer's literature. For example, Modmor-I® graphite fiber is described as having a modulus of $55 \times 10^6$ lb./in.$^2$ and a tensile strength of $200 \times 10^3$ lb./in.$^2$. Thornel-75S® graphite fiber is reported to exhibit a modulus of $73 \times 10^6$ lb./in.$^2$ and a tensile strength of $345 \times 10^3$ lb./in.$^2$. Samples of E-glass yarn customarily exhibits a modulus of about $10.5 \times 10^6$ lb./in.$^2$ and a tensile strength of $250$–$500 \times 10^3$ lb./in.$^2$. Nomex® polyamide yarn exhibits a tenacity of 5.3 g.p.d., an elongation of 22%, and an initial modulus of 140 g.p.d.

Measurements and testing procedures

The American Society for Testing and Materials (ASTM) test method D790–66 (Procedure A) is used for testing flexural properties with some modifications. Unidirectional composite specimens have the following dimensions: *Length:* 6 inches; *width:* 0.5 inch; *thickness:* 0.120–0.135 inch. These specimens are tested on a 4 inch span. This arrangement provides a span to thickness ratio of about 28 to 34. The loading nose (0.125 inch radius) is operated at a crosshead rate of 0.05 inch/minute. Specimens of the examples that did not conform to the dimensions above were tested so that the span to thickness ratio falls in the interval defined above, unless otherwise noted.

Flexural modulus

The flexural modulus (lb./in.$^2$) as used herein is obtained by drawing a tangent to the steepest initial straight-line portion of the load deformation curve and applying Equation 5 of ASTM D790–66.

Flexural proportionality limit stress

Flexural proportionality limit stress (lb./in.$^2$) is the stress calculated using the largest load on the steepest initial straight-line portion of the load-deformation curve and Equation 3 of ASTM D790–66. It is observed that for some composites the proportionality limit is the same as flexural strength indicating no yield from the initial straight-line.

Flexural offset yield strength

Flexural offset yield strength (lb./in.$^2$) is the stress at which the stress-strain curve deviates by a given strain (offset) from the tangent to the initial straight-line portion of the stress-strain curve. As used herein, this stress is determined at a value of 0.02% offset strain. The method of calculation is that described in ASTM D790–66 (11.5) and in the appendix to ASTM D638–68.

Flexural strength or ultimate flex strength

Flexural strength or ultimate flex strength (lb./in.$^2$) is equal to the apparent stress calculated by Equation 3 of ASTM D790–66 using the maximum load supported by the sample just prior to failure.

Flexural proportionality limit strain

Flexural proportionality limit strain (percent) is the strain calculated by Equation 4 of ASTM D790–66 using the largest deflection measured on the steepest initial straight-line portion of the load-deformation curve.

Flexural offset yield strain

Flexural offset yield strain (percent) is the strain calculated by Equation 4 of ASTM D790–66 using the deflection at a 0.02% offset strain from the tangent to the initial straight-line portion of the load deflection curve.

Ultimate flexural strain

Ultimate flexural strain (percent) is equal to the apparent strain calculated by Equation 4 of ASTM D790–66 using the deflection measured in the sample just prior to failure.

Impact strength

Impact strength (ft.-lb./in.$^2$), as used herein, is the value of energy expended in breaking each individual unnotched composite specimen divided by the cross-sectional area of the sample. The energy expended is measured by the Simple Beam (Charpy Type) Test described in ASTM D256–56, Method B, modified to the extent that the composite specimen has the following dimensions: *Length:* 5 or 6 inches; *width:* 0.5 inch; *thickness:* 0.070–0.135 inch. The sample is struck on the 0.5 inch by 6 inch face while placed across a 4 inch span. This permits the energy to be measured in the above units.

Rule of Mixtures calculation

Having measured the composite stress $\sigma_{O_1}$ at a given strain in an organic composite control of fiber volume fraction $v_{O_1}$, and the composite stress $\sigma_{I_1}$ at the same strain in an inorganic composite control of fiber volume fraciton $v_{I_1}$, the Rule of Mixtures predicts that a blend composite containing $v_{O_2}$ organic fiber volume fraction, $v_{I_2}$ inorganic fiber voume fraction and $v_M$, matrix volume fraction will support at the same strain the composite stress $\sigma_C$:

$$(1) \quad \sigma_C = \sigma_{O_1} \frac{v_{O_2}}{v_{O_1}} + \sigma_{I_1} \frac{v_{I_2}}{v_{I_1}} + \sigma_M v_M$$

where the contribution of the stress in the matrix $\sigma_M$ can be neglected without large error. Comparison of measured values with those obtained by applying (1) demonstrate the property advantage of the composites of this invention over those predicted by the rule of mixtures.

Example 1

This example illustrates preparation and properties of a composite of this invention wherein the reinforcement is provided by separate, unidirectional layers of poly(p-benzamide) fabric and graphite tape.

Poly(p-benzamide) fabric [8-harness stain, comprised of 90 ends/inch of 400 denier yarn (warp direction), 2 turns/inch, having filament properties within the following ranges: T/E/mi: 16–18/1.5–1.7/1100–1200, and 12 picks/inch of 100 denier yarn (weft direction), 2 turns/inch, having the following filament properties: T/E/Mi: 15/1.6/1050, 5.4±0.1 oz./yd.$^2$] is sized with a methacrylic acid size which is premitted to remain on the fabric. The fabric is then prepregged with an epoxy resin with dicyandiamide curing agent in ethylene dichloride solvent to the level of 50% by volume resin. A 2 in. x 6 in. unidirectional composite is prepared by first plying the above-described prepregged poly(p-benzamide) fabric with high modulus Modomor-I® graphite fiber prepreg sheet (Modulite 5206–I, product of the Whittaker Corp., prepregged with epoxy resin to the extent of 41% by weight). Eighteen (18) plies are employed (fibers run in the 6-in. direction) and every third ply (from the top) is a layer of Modmor-I® prepreg (i.e., bottom ply is graphite). Then, curing of the composite is accomplished as follows:

(1) The composite is placed between slightly oversize pieces of Teflon® FEP fluorocarbon film which are then placed between 2 in. x 6 in. stainless steel plates. The plates, with the composite in the middle, are then wrapped with a piece of Teflon® FEP film around the 2 in. dimension to prevent lateral movement of the graphite.

(2) The sample is now placed on a larger stainless steel plate and 3 pieces of glass fabric are placed over it to act as a bleeder fabric and allow a path for volatile removal. Vacuum bag sealing tape is placed around the covered composite and a ⅛ inch thick Neoprene® sheet placed over the entire assembly. The Neoprene® sheet has a tire value stem (minus core) inserted through it as a vacuum pump connection.

(3) The vacuum bag assembly is pumped down, inserted in a cold press, heated to 275° F. in 30 min. and held thereat for 30 minutes. Pressure of 100 lb./in.$^2$ is then applied to the assembly, the bag vented to atmosphere, then heated to 350° F. at which temperature it is held 2 hours before being cooled to 150° F. before releasing the pressure.

The blend composite (A) averages 0.122 inch in thickness and has the following composition (volume basis): 49% poly(p-benzamide), 22% graphite, 29% resin. Similar unidirectional epoxy composites are made with all-graphite tape (B) (69% by volume, 12 plies) and the all-poly(p-benzamide) fabric (C) (72% by volume, 15 plies), respectively. After each composite is cured, the 2 inch x 6 inch pieces are cut into approximately 0.45 inch x 6 inch strips and the edges smoothed on a metallographic polishing wheel.

Properties of the cured composites are shown below in Table 1. Because composite A is nonsymmetric, values reported for it are averages (in good agreement with individual values) obtained by subjecting both sides of the composite for property determination. For flexural properties, the span to specimen thickness ratio was 32.5 for A; 36.0 for B; and 34.0 for C, respectively. From Table 1, it is to be noted that ultimate flex strength and off-set yield strength of A are higher than "Predicted" by the Rule of Mixtures. Impact strength for A is about 2.5× greater than that for B (graphite) and its mode of failure in flexure is not catastrophic, in contrast to B.

Example 2

This example illustrates preparation and properties of composites of this invention wherein the reinforcement is provided by uniformly distributed unidirectional plies of poly(p-benzamide) fabric and graphite tapes wherein pairs or triplets of plies are alternately positioned in 0°–90° cross-ply constructions.

Poly(p-benzamide) fabric, free of the weaving size, is prepregged to 45% by volume of epoxy resin. The graphite prepreg used is the Modulite 5206–I described in Example 1. The composite samples are prepared with a width of 2 inches and a length of 6 inches, with the 6 inch dimension in the 0° direction. The blend composites are prepared with the following configurations, where X represents a ply of poly(p-benzamide) prepreg and Y represents a ply of the graphite prepreg.

Composite A: $\frac{XY}{0°} \frac{YX}{90°} \frac{XY}{0°} \frac{YX}{90°} \frac{XY}{90°} \frac{YX}{0°} \frac{XY}{90°} \frac{XY}{0°}$ Composite B:

$\frac{XYX}{0°} \frac{XYX}{90°} \frac{XYX}{0°} \frac{XYX}{90°} \frac{XYX}{90°} \frac{XYX}{0°} \frac{XYX}{90°} \frac{XYX}{0°}$ In the cured composites (see below) the amounts of each fibrous component are as follows.

Percent by volume

Composite A:
  Poly(p-benzamide) _____ 35
  Modmor-I _____ 30
Composite B:
  Poly(p-benzamide) _____ 47
  Modmor-I _____ 20

The samples are assembled in a vacuum bag arrangement as described in Example 1 and cured as follows:

Vacuum bag is pumped down, inserted in cold press and heated to 85° C. and held thereat ½ hour; heated to 145° C. and held thereat 15 minutes, 75 lb./in.² pressure applied, vacuum released, held 15 minutes; heated to 175° C., and held thereat 1 hour, cooled under pressure.

Strips are cut from the 2 inch x 6 inch composite for testing and the edges are smoothed.

Control composite C, reinforced with the all graphite tape prepreg (77% by volume, 13 plies), and control composite D, reinforced with the all-poly(p-benzamide) fabric prepreg (78% by volume, 20 plies) are prepared by the procedure described above. In both composites C and D the fabric plies are alternated in the 0° and 90° directions.

Properties of these cross-ply composites are shown below in Table 1. Values reported for composite A are averages (in good agreement with individual values) obtained by subjecting both sides of the composite for property determination.

It is to be noted that for both composite A and B the values of ultimate flex strength, proportionality limit, flex modulus, and off-set yield strength exceed the values predicted for these parameters by rule of mixtures calculations. Also, impact strength for A and B are 5× and 7×, respectively, than that for C.

Example 3

This example illustrates preparation and properties of composites of this invention wherein the reinforcement is provided uniformly distributed, unidirectional plies of poly (p-benzamide) fabric and E glass tape. These composites demonstrate unexpectedly high load carrying capability.

Poly(p-benzamide) fabric is prepregged as in Example 2. The glass tape used is "Scotchply" 1002 E-glass tape (product of the 3M Co., St. Paul, Minn.). The blend composites are prepared as follows:

Composite A.—15 unidirectional plies, with plies 2, 5, 8, 11, 14, being E glass tape and the rest poly(p-benzamide) fabric. The outside layers are the poly(p-benzamide) fabric. Composite B.—15 unidirectional plies, with plies 1, 4, 8, 12, 15 being E glass tape and the rest poly (p-benzamide) fabric. The outside layers are thus E-glass tape.

In the cured composites (see below) the amounts of each reinforcement are as follows:

| | Percent by volume | |
|---|---|---|
| | Poly(p-benzamide) | E-glass |
| Composite: | | |
| A | 43 | 19 |
| B | 43 | 19 |

The samples are assembled for curing in a vacuum bag arrangement as described in Example 1. The curing of the samples is accomplished as follows:

Vacuum bag is pumped down, inserted into a cold press, heated to 85° C. and held thereat for 15 minutes, heated to 145° C. and held thereat for 30 minutes, 75 lb./in.² pressure applied, vacuum released, heated to 175° C. and held thereat for 1 hour, cooled under pressure, post-cured at 150° C. for 16 hours.

Unidirectional control composite C, reinforced with the E-glass tape (12 plies, 50% by volume) is prepared by a similar vacuum bag technique as follows: pump down vacuum bag, insert into a cold press; heat to 95° C. hold 30 minutes; heat to 120° C., hold 30 minutes; apply 50 p.s.i. external pressure and release vacuum; heat to 165° C., hold 2 hours, cool under pressure; post-cure 16 hours at 150° C.

Unidirectional control composite D, reinforced with the poly(p-benzamide) prepreg fabric (15 plies, 72% by volume), is prepared by the procedures described in Example 1.

Properties of these composites are shown below in Table 1. Composites A and B exhibit higher values for ultimate flex strength, proportionality limit, and off-set yield strength than predicted by the rule of mixtures. In addition, the impact strength for the blend samples was higher than for both the organic (D) and inorganic (C) control specimens.

Example 4

This example demonstrates the outstanding balance of properties shown by a unidirectional composite of this invention wherein the reinforcement is provided by a fiber prepared by cowinding, side-by-side, a high modulus fiber of a p-oriented aromatic polyamide and a graphite fiber.

The poly(p-benzamide) fiber exhibits the following tensile properties: T/E/Mi: 18/1.85/1065.

Poly(p-benzamide) fiber (5.75 g., 400 denier) and "Thornel 75S" graphite fiber (7.7 g., 525 denier, product of Union Carbide Corp.) are cowound, side-by-side onto a 6-inch long open-end Teflon®-coated double mold, having a cross-section in the form of an I beam and two cavities 0.5 in. wide. Both yarns are taken from individual yarn packages through a tensioning device, between two infrared lamps, through a traversing device, onto the mold. Resin is dripped onto the yarn as the mold is rotated on an axis transverse to its 6-inch length and the yarn is wound across the 0.5 inch wide cavity by means of a traversing guide.

The resin consists of a mixture of 10 parts "Epon 815" epoxy resin (Shell Chemical Co.), 9 parts "Nadic" (methyl anhydride curing agent, Allied Chemical Corp.) and 0.1 part benzyldimethylamine. The open mold is placed in a vacuum oven at room temperature for 16 hours to degas. Degassed "Epon 815" resin mixture is poured on the sample and the mold closed. The composite is cured in an oven for 2 hours at 150° C. then for 16 hours at 175° C. The composite (A) has a thickness of 0.124 inch, a fiber volume loading of 31% poly(p-benzamide) and 34% graphite fiber, and a density of 0.054 lb./in.³.

Control composites are prepared in the same manner, and (B) with "Thornel 75S" (63 volume percent fiber), composite density of .058 lb./in.³ and the other (C) with poly(p-benzamide) as reinforcement (57 volume percent fiber, T/E/Mi: 18.2/1.6/1210, composite density of 0.049 lb./in.³).

Properties of composites A, B, and C, determined by the methods described previously, are shown in Table 1.

Composite A exhibits higher values for ultimate flex strength, proportionality limit, and off-set yield strength than predicted by the rule of mixtures.

Example 5

This example demonstrates that a unidirectional composite of this invention wherein the reinforcement is provided by a yarn obtained by wrapping together a high modulus yarn of a p-oriented aromatic polyamide and a graphite yarn possesses unexpectedly high levels of useful properties.

"Thornel 75S" graphite yarn (525 denier) is held in a wrapping machine and wrapped with two ends of poly(p-benzamide) yarn (twisted 2 turns/inch and coated with an antistatic finish). The latter yarn exhibits the following tensile properties: T/E/Mi: 19.8/1.5/1320. After the ends are wrapped in opposite directions with 4 wraps/in. of each end, the wrapped yarn is soaked 1 hour in trichloroethylene to remove the antistatic finish.

A unidirectional composite is prepared as described in Example 4. The cured composite (A) comprises 29% by volume poly(p-benzamide) and 33% by volume graphite yarns, and exhibits a density of 0.053 lb./in.³. Control composites are those labeled B and C in Example 4, above.

Properties of these composites are shown below in Table 1. Composite A exhibits higher values for ultimate flex strength, proportionality limit, and off-set yield strength than predicted by the Rule of Mixtures.

Example 6

This example demonstrates preparation and properties of a unidirectional composite of this invention wherein the reinforcement is provided by a yarn obtained by wrapping together a high modulus yarn of a p-oriented aromatic polyamide and a fiber glass yarn. This composite exhibits unexpectedly high levels of flexural properties when contrasted with an all-fiber glass composite.

S-fiber glass yarn (310 denier, product of Owens-Corning, 1 turn/inch) is wrapped 4 wraps/inch with one end of poly(p-benzamide) yarn, 180 denier, twisted 2 turns/inch. The latter yarn exhibits the following tensile properties: T/E/Mi: 19.8/1.5/1320. The S-glass yarn has a modulus of $12.2 \times 10^6$ lb./in.$^2$ and a tensile strength of $188 \times 10^3$ lb./in.$^2$ as measured by the procedure described herein for measuring organic fiber tensile properties.

A unidirectional composite (A) is made as described in Example 4. It comprises 30% by volume of S-fiber glass and 30% by volume of poly(p-benzamide) yarns, and has a density of 0.061 lb./in.$^3$. A control composite (B), containing 55% by volume of S-fiber glass, is prepared in the same manner and has a density of 0.065 lb./in.$^3$. A polyamide control composite (C) is also prepared in this manner, containing 65% volume of a similar poly(p-benzamide) fiber (T/E/Mi: 15.4/1.3/1220) and having a density of 0.050 lb./in.$^3$.

Properties of these composites are shown in Table 1. Composite A exhibits a higher value for ultimate flex strength than predicted by the Rule of Mixtures.

Example 7

This example illustrates the preparation and properties of unidirectional composites of this invention wherein the reinforcement is provided by Nomex® polyamide fibers, used in combination with graphite fibers.

The following general procedure is used. The composite is prepared in a 6 inch long open-end Teflon®-coated double mold having a cross-section in the form of an I-beam and two cavities 0.5 inch wide. Continuous lengths of the Nomex® yarn plied to 800 denier with zero turns/inch is combined with 654 denier Thornel-25® graphite yarn (modulus=$25 \times 10^6$ lb./in.$^2$, strength=$180 \times 10^3$ lb./in.$^2$), both conducted from yarn packages through a yarn tensioning device adjusted for minimum tension, between two infrared heat lamps, and finally through a bath of epoxy resin. (The Nomex® yarn has previously been scoured and rinsed to remove yarn finish that might interfere with epoxy adhesion.)

After a total of 12 g. of fiber wet with resin are wound on the female of the mold and uniformly positioned across the 0.5 inch wide cavity of the mold with the aid of a traversing guide (the mold is rotated on an axis transverse to its 6 inch length), the winding is stopped. The feed yarn is cut, the female mold removed from the wind-up, and the male section of the mold fitted into the 0.5 inch wide cavities of the female section and fastened with screws to a molding thickness (individual thicknesses are shown below). This action extrudes excess resin out the open ends of each mold. Each mold and its contents are heated for 16 hours at 105° C. and then for 16 hours at 165° C. in an air circulating oven after which the oven is allowed to reach room temperature. The male section is removed from the oven and the curved ends of the fiber wrapping cut with a saw while still attached to the female to give two composite samples A.

The molding thickness is 0.136 inch. The yarn volume percent in the composition is 36% polyamide and 34% graphite.

A polyamide control composite C (0.134 inch thick) for comparison with the composite above is prepared containing 68% by volume of uniformly distributed Nomex®. A graphite control composite B (0.138 inch thick) is also prepared containing 61.2% by volume of Thornel-25® graphite. The control composites were made in a generally similar but not identical manner.

Properties of the composites are presented below in Table 2. The composite containing both Nomex® and graphite exhibits higher value for proportionality limit than predicted by the Rule of Mixtures.

A composite was prepared as above except that the reinforcement was provided by poly(chloro-p-phenylene terephthalamide) fiber (T/E/Mi=15.4/1.5/1030) in combination with graphite fibers. The polyamide was plied to 665 denier with zero turns/inch and combined with 640 denier HMG-50 graphite yarn. The molding thickness was 0.139 inch. The yarn volume percent in the composition was 29.4% polyamide and 23.8% graphite. The composite (X) has the properties presented below in Table 2.

TABLE 1

| Example | Composite | Ultimate flex Strength, 10³ lb./in.² | Ultimate flex Strain, percent | Proport limit Stress, 10³ lb./in.² | Proport limit Strain, percent | Flex modulus, 10⁵ lb./in.² | Off-set yield Strength, 10³ lb./in.² | Off-set yield Strain, percent | Impact strength, ft.-lb./in.² |
|---|---|---|---|---|---|---|---|---|---|
| 1 | A (mixed) | 77 | 0.55 | 46 | 0.24 | 19 | 68 | 0.37 | 42 |
| 1 | B (graphite) | 104 | 0.32 | 102 | 0.32 | 32 | (*) | | 17 |
| 1 | C (organic) | 82 | 2.44 | 35 | 0.26 | 13 | 45 | 0.34 | 77 |
| 1 | Predicted | 62 | 0.32 | 51 | 0.26 | 19 | 62 | 0.32 | |
| 2 | A (mixed) | 51 | 0.55 | 36 | 0.24 | 15 | 43 | 0.31 | 38 |
| 2 | B (mixed) | 46 | 0.42 | 27 | 0.21 | 13 | 42 | 0.34 | 61 |
| 2 | C (graphite) | 70 | 0.35 | 67 | 0.34 | 20 | (*) | | 7.7 |
| 2 | D (organic) | 49 | 1.95 | 19 | 0.25 | 7.7 | 24 | 0.31 | 49 |
| 2 | Predicted A | 41 | 0.35 | 28 | 0.25 | 11 | 35 | 0.31 | |
| 2 | Predicted B | 36 | 0.35 | 24 | 0.25 | 10 | 31 | 0.31 | |
| 3 | A (mixed) | 123 | 2.32 | 29 | 0.27 | 11 | 39 | 0.40 | 151 |
| 3 | B (mixed) | 134 | 2.50 | 30 | 0.25 | 10 | 40 | 0.44 | 159 |
| 3 | C (glass) | 129 | 2.85 | 53 | 1.02 | 5.6 | 67 | 1.28 | 144 |
| 3 | D (organic) | 83 | 2.50 | 38 | 0.26 | 13 | 45 | 0.34 | 77 |
| 3 | Predicted A | 95 | 2.50 | 26 | 0.26 | 10 | 33 | 0.34 | |
| 3 | Predicted B | 95 | 2.50 | 26 | 0.26 | 10 | 33 | 0.34 | |
| 4 | A (mixed) | 88 | 0.46 | 70 | 0.30 | 23 | 81 | 0.36 | 47 |
| 4 | B (graphite) | 91 | 0.28 | 70 | 0.22 | 31 | (*) | | 15 |
| 4 | C (organic) | 85 | 2.50 | 42 | 0.43 | 9.7 | 52 | 0.56 | 130 |
| 4 | Predicted | 64 | 0.28 | 49 | 0.22 | 22 | 64 | 0.28 | |
| 5 | A (mixed) | 90 | 0.46 | 80 | 0.35 | 23 | 87 | 0.38 | 27 |
| 5 | B (graphite) | 91 | 0.28 | 70 | 0.22 | 31 | (*) | | 15 |
| 5 | C (organic) | 85 | 2.50 | 42 | 0.43 | 9.7 | 52 | 0.56 | 130 |
| 5 | Predicted | 62 | 0.28 | 47 | 0.22 | 21 | 62 | 0.28 | |
| 6 | A (mixed) | 145 | 2.70 | 27 | 0.29 | 9.4 | 37 | 0.44 | 200 |
| 6 | B (glass) | 155 | 2.70 | 120 | 2.06 | 5.8 | 137 | 2.36 | 250 |
| 6 | C (organic) | 81 | 2.70 | 39 | 0.30 | 13 | 50 | 0.40 | 148 |
| 6 | Predicted | 112 | 2.70 | 27 | 0.30 | 9.1 | 36 | 0.40 | |

*Broke below 0.02% offset strain.

TABLE 2

| Composite | Ultimate flex Strength, 10³ lb./in.² | Ultimate flex Strain, percent | Proport limit Stress, 10³ lb./in.² | Proport limit Strain, percent | Flex modulus, 10⁶ lb./in.² | Off-set yield Strength, 10³ lb./in.² | Off-set yield Strain, percent | Impact strength, ft.-lb./in.² |
|---|---|---|---|---|---|---|---|---|
| A (mixed) | 68 | 1.02 | 40 | 0.53 | 7.5 | 57 | 0.78 | 42 |
| B (graphite) | 105 | 1.05 | 37 | 0.36 | 10.4 | *89 | 0.89 | 31 |
| C (organic) | 41 | 4.51 | 11 | 0.63 | 1.75 | 29 | 1.68 | 81 |
| Predicted | 72 | 1.05 | 24 | 0.36 | 6.7 | 57 | 0.89 | |
| X | 84 | 0.41 | 50 | 0.33 | 15 | 76 | 0.52 | 32 |

*Fracture had begun prior to this stress.

Example 8

This example illustrates the preparation and outstanding properties of a composite of this invention wherein the reinforcement is provided by a fiber prepared by cowinding, side-by-side, poly(p-benzamide) and glass yarns, using a polyester matrix resin.

Yarns of poly(p-benzamide) (5.6 g., 340 denier, T/E/Mi: 17.5/1.7/1140) and E glass (10.1 g., 610 denier; ECDE 150 1/0 2 ends, Owens-Corning Company), dried under heat lamps, are cowound, side-by-side, onto the base portion of a polytetrafluoroethylene-coated open end cavity steel mold (I-beam shape). As the yarns are wound on the mold, they are saturated with a matrix resin prepared from "Paraplex" P-43 polyester (Rohm and Haas) and a benzoyl peroxide curing agent, mixed in the ratio of 2,250 parts resin to 22.7 parts curing agent dissolved in 175 parts of acetone. Winding tension is about 50 grams and enough fiber is used to give a nominal 60% by volume fiber content. Excess resin is allowed to drain off and the molds are closed against ⅛ inch shims to squeeze out additional resin. The samples are cured in an air circulating oven at 125° C. for 16 hours, after which they are removed from the mold and tested for flexural and impact properties. A test composite (A) has a fiber volume loading of 31% poly(p-benzamide) and 32% glass yarns, and a density of 1.74 g./cm.³.

Properties of this composite 8 determined by the methods described previously are shown in Table 3.

Example 9

This example illustrates the preparation and properties of a composite of this invention wherein the reinforcement is provided by a yarn prepared by cowinding, side-by-side, poly(p-benzamide) and graphite yarns, using a polyimide matrix resin.

The poly(p-benzamide) yarn of Example 8 and Hitron® HMG-50 high modulus graphite (Hitco, Incorporated) are cowound onto a mold as described in Example 8. As the yarns are wound, they are saturated with "Skybond 703" polyimide resin (Monsanto Company) which has been diluted to 45% solids with methanol. The winding tension is about 50 grams and sufficient yarn is used to give a nominal 60% by volume yarn content. Excess resin is allowed to drain off and the contents of the mold are allowed to stand for several hours to permit evaporation of solvent. The top and bottom male portions of the mold are then placed lightly in position. The sample, still on the mold, is then placed in a vacuum bag and a vacuum pulled on the system. The vacuum bag assembly is then placed in a cold press which is brought up to contact and heated to 180° C. over a period of one hour. At that temperature, enough pressure is applied to bring the sample to ⅛ inch thickness. The sample is maintained at 180° C. for 30 minutes, then cooled under pressure. The composite samples are removed from the mold and postcured for 2 hours, each, at 200° C., 225° C., 250° C. and for 6 hours at 300° C.

These composites have a yarn volume loading of 25% poly(p-benzamide) and 40% graphite, and a density of 1.23 g./cm.³. About 22% by volume voids are present.

Properties of this composite 9 are shown in Table 3.

Example 10

This example illustrates the preparation and properties of the composite of this invention wherein the reinforcement is provided by a fiber prepared by cowinding, side-by-side, poly(p-benzamide) and graphite yarns, using a phenolic matrix resin.

Yarns of poly(p-benzamide) (5.7 g., same yarn as Example 8) and Thornel 75S® yarn (8.3 yarns, 525 denier) are dried and wound at about 50 grams tension onto a mold in the manner described in Example 8. As the yarns are wound onto the mold, they are saturated with "Adloc 851" phenolic resin (American Reinforced Plastics Company). Excess resin is allowed to drain off, the top and bottom male mold pieces set in place and the sample is cured as follows: (1) it is placed in an 18 inch x 18 inch Pasadena press, brought to contact, then heated to 180° C. over a period of 90 minutes; (2) when the temperature reaches 140° C., enough pressure is applied to push the top and bottom pieces of the mold against ⅛ inch shims; (3) the sample is held at 180° C. for 1 hour after which it is cooled under pressure in the press.

The samples are then removed from the mold and tested according to the procedures previously described. This composite (A) has a yarn volume loading of 30% poly(p-benzamide) and 35% graphite fiber, and a density of 1.53 g./cm.³.

Properties of the above-described composite 10 are shown in Table 3.

Example 11

This example illustrates the preparation and properties of composites of this invention wherein the reinforcement is provided by yarns prepared by cowinding, side-by-side, high modulus fibers of a p-oriented polyamide and carbon fibers. Use of polyamide fibers of different tensile property levels in different composites is illustrated.

The carbon fiber used herein is grade $GSC_Y2-2$ (Carborundum Corp.) 1200 denier continuous filament yarn having individual filament properties of $100–180 \times 10^3$ lb./in.² tensile strength, $3.5 \times 10^6$ lb./in.² modulus, and a density of 1.50 g./cm.³ (manufacturer's quoted values). Yarns of poly(p-benzamide) (400 denier T/E/Mi=17.3/1.6/1161) and the above-described carbon, dried under heat lamps, are cowound under 30–50 g. tension onto a mold. As the yarns are wound on the mold, they are saturated with an epoxy matrix resin. The sample is wound to a nominal 60% by volume fiber content, the male portions of the mold closed against ⅛ inch shims, and the sample cured in an air circulating oven as follows: 2 hours at 85° C., 2 hours at 120° C., and 3 hours at 160° C. The composite (11) [27% poly(p-benzamide) and 33% carbon yarn by volume] is removed and tested in flexure and Charpy impact. A second composite (12) is prepared in a similar manner from this carbon yarn and another poly(p-benzamide) yarn (788 denier, T/E/Mi=11.4/6.6/457). Composite 12 contains 27% poly(p-benzamide) and 35% carbon yarn by volume.

Composites 11 and 12 exhibit higher values for ultimate flex strengths, proportionality limit, off-set yield strength than predicted by the Rule of Mixtures. The properties are shown in Table 3.

The composites of the invention are useful in various structural forms, e.g., arches, plates, airfoils, etc. Useful composites other than those specifically described in the examples but which may be made in a manner similar thereto include epoxy resin reinforced with uniformly distributed Nomex® and glass fiber, epoxy resin reinforced with uniformly distributed poly(p-phenylene terephthalamide) and boron fiber and epoxy resin reinforced with uniformly distributed poly(p-benzamide) and boron fiber or polycrystalline aluminum oxide fibers.

TABLE 3

| Composite | Ultimate flex | | Proport limit | | Flex modulus, $10^6$ lb./in.$^2$ | Off-set yield | | Impact strength, ft.-lb./in.$^2$ |
|---|---|---|---|---|---|---|---|---|
| | Strength, $10^3$ lb./in.$^2$ | Strain, percent | Stress, $10^3$ lb./in.$^2$ | Strain, percent | | Strength, $10^3$ lb./in.$^2$ | Strain, percent | |
| 8 | 125 | 2.67 | 30 | 0.34 | 8.7 | 40.4 | 0.48 | 137 |
| 9 | 43 | 0.27 | 32 | 0.19 | 17 | (*) | | 27 |
| 10 | 81 | 0.40 | 43 | 0.17 | 26 | 76 | 0.32 | 47 |
| 11 | 106 | 2.50 | 19 | 0.28 | 6.9 | 27 | 0.41 | 130 |
| 12 | 88 | 2.90 | 33 | 0.74 | 4.5 | 39 | 0.91 | 150 |

*Broke below .02% offset strain.

What is claimed is:

1. A composite comprising an organic resin matrix with reinforcement layers of high modulus organic fibers having a tenacity of at least about 4 g.p.d. and a tensile modulus of at least about 140 g.p.d. alternating with layers of inorganic fibrous material, the resin matrix comprising from 15 to 70% by volume, the organic fiber comprising from 15 to 70% by volume, and the inorganic fibrous material comprising from 15 to 70% by volume, all based on the composite.

2. A composite of claim 1 wherein the resin matrix comprises from 30 to 60% by volume, the organic fibers comprise from 20 to 50% by volume and the inorganic fibrous material comprises from 20 to 50% by volume, all based on the composite.

3. The composite of claim 1 wherein the inorganic fibrous material is graphite fiber.

4. The composite of claim 1 wherein the inorganic fibrous material is glass fiber.

5. The composite of claim 1 wherein the organic fiber is poly(p-benzamide).

6. The composite of claim 1 wherein the organic fiber is poly(p-phenylene terephthalamide).

7. The composite of claim 1 wherein the organic resin matrix is uncured.

References Cited
UNITED STATES PATENTS 3,556,922   1/1971   Green et al. _____ 161—170
3,649,435   3/1972   Varlas _____ 161—170

WILLIAM J. VAN BALEN, Primary Examiner

U.S. Cl. X.R.

161—170, 176